United States Patent
Horsley

(10) Patent No.: US 10,907,650 B2
(45) Date of Patent: Feb. 2, 2021

(54) COMPRESSOR AND TURBOCHARGER

(71) Applicant: Cummins Ltd., Huddersfield (GB)

(72) Inventor: John R. Horsley, Huddersfield (GB)

(73) Assignee: CUMMINS LTD., London (GB)

( * ) Notice: Subject to any disclaimer, the term of this patent is extended or adjusted under 35 U.S.C. 154(b) by 0 days.

(21) Appl. No.: 16/752,728

(22) Filed: Jan. 27, 2020

(65) Prior Publication Data
US 2020/0158132 A1 May 21, 2020

Related U.S. Application Data

(63) Continuation of application No. 15/178,196, filed on Jun. 9, 2016, now Pat. No. 10,578,122.

(30) Foreign Application Priority Data
Jun. 10, 2015 (GB) .................................. 1510057.1

(51) Int. Cl.
*F04D 29/42* (2006.01)
*F04D 29/44* (2006.01)
(Continued)

(52) U.S. Cl.
CPC ........... *F04D 29/4206* (2013.01); *F01D 5/00* (2013.01); *F01D 9/04* (2013.01); *F02B 37/02* (2013.01);
(Continued)

(58) Field of Classification Search
CPC .. F04D 29/4206; F04D 29/441; F04D 25/045; F02B 37/02; F05D 2220/40; F05D 2250/52; F05B 2250/502; Y02T 10/144
See application file for complete search history.

(56) References Cited

U.S. PATENT DOCUMENTS 2,471,174 A * 5/1949 Trumpler ................ F04D 17/10
415/58.6
8,550,775 B2 10/2013 Chen
(Continued)

FOREIGN PATENT DOCUMENTS

DE 102013201771 A1 * 8/2014 ......... F04D 29/4206
EP 1930602 A2 6/2008

OTHER PUBLICATIONS

Search Report issued by the United Kingdom Intellectual Property Office, dated Nov. 11, 2015, for related German Application No. 1510057.1; 4 pages.

*Primary Examiner* — Christopher Verdier
(74) *Attorney, Agent, or Firm* — Faegre Drinker Biddle & Reath LLP

(57) ABSTRACT

A compressor comprises a housing having an axial intake and an annular outlet volute. An impeller is mounted on a shaft for rotation about a shaft axis between the axial intake and the annular outlet volute. The impeller has a plurality of blades, each blade having a front edge facing the axial intake and a tip. The annular outlet volute includes an annular diffuser passage surrounding the impeller. The annular diffuser passage has a diffuser inlet downstream of the plurality of blades and a diffuser outlet communicating with the annular outlet volute, the tips of the blades sweeping across said diffuser inlet during use. A wall of the housing which defines the annular diffuser passage and which extends over the front edges of the blades defines an annular recess extending from the diffuser inlet towards the diffuser outlet.

22 Claims, 6 Drawing Sheets

(51) Int. Cl.

| | | |
|---|---|---|
| *F01D 9/04* | (2006.01) | |
| *F01D 5/00* | (2006.01) | |
| *F02B 37/02* | (2006.01) | |
| *F04D 25/04* | (2006.01) | |
| *F04D 29/28* | (2006.01) | |
| *F04D 29/66* | (2006.01) | |

(52) U.S. Cl.
CPC ......... *F04D 25/045* (2013.01); *F04D 29/284* (2013.01); *F04D 29/441* (2013.01); *F04D 29/661* (2013.01); *F05D 2220/40* (2013.01); *F05D 2250/52* (2013.01); *Y02T 10/12* (2013.01)

(56) References Cited

U.S. PATENT DOCUMENTS

| | | | |
|---|---|---|---|
| 10,578,122 B2* | 3/2020 | Horsley | F01D 9/04 |
| 2006/0275113 A1* | 12/2006 | Chen | F04D 29/162 |
| | | | 415/206 |
| 2008/0138200 A1* | 6/2008 | Umeyama | F04D 29/464 |
| | | | 415/204 |
| 2011/0041494 A1* | 2/2011 | Parker | F02C 6/12 |
| | | | 60/605.1 |
| 2016/0363129 A1 | 12/2016 | Horsley | |
| 2017/0261001 A1* | 9/2017 | Masutani | F04D 29/284 |

\* cited by examiner

COMPRESSOR AND TURBOCHARGER

CROSS-REFERENCE TO RELATED APPLICATION

This application is a continuation of U.S. application Ser. No. 15/178,196, filed on Jun. 9, 2016, entitled "COMPRESSOR AND TURBOCHARGER," now U.S. Pat. No. 10,578,122, which claims the benefit of priority to United Kingdom Patent Application No. 1510057.1, filed on Jun. 10, 2015, the entire disclosures of which being incorporated herein by reference.

FIELD OF THE DISCLOSURE

The present disclosure relates to a compressor, particularly but not exclusively, a compressor for use in a turbocharger, such as a variable geometry turbocharger. The present invention also relates to a compressor housing per se suitable to receive an impeller to provide a compressor.

BACKGROUND

A compressor comprises an impeller wheel, carrying a plurality of blades (or vanes) mounted on a shaft for rotation within a compressor housing. Rotation of the impeller wheel causes gas (e.g. air) to be drawn into the impeller wheel and delivered to an outlet chamber or passage. In the case of a centrifugal compressor the outlet passage is in the form of a volute defined by the compressor housing around the impeller wheel and in the case of an axial compressor the gas is discharged axially.

Turbochargers are well known devices for supplying air to the intake of an internal combustion engine at pressures above atmospheric pressure (boost pressures). A conventional turbocharger essentially comprises a housing in which is provided an exhaust gas driven turbine wheel mounted on a rotatable shaft connected downstream of an engine outlet manifold. A compressor impeller wheel is mounted on the opposite end of the shaft such that rotation of the turbine wheel drives rotation of the impeller wheel. In this application of a compressor, the impeller wheel delivers compressed air to the engine intake manifold. The turbocharger shaft is conventionally supported by journal and thrust bearings, including appropriate lubricating systems.

In known turbochargers, the turbine stage comprises a turbine chamber within which the turbine wheel is mounted; an annular inlet passage defined between facing radial walls arranged around the turbine chamber; an inlet arranged around the inlet passage; and an outlet passage extending from the turbine chamber. The passages and chambers communicate such that pressurised exhaust emissions, including gaseous and particulate species, admitted to the inlet chamber flow through the inlet passage to the outlet passage via the turbine and rotate the turbine wheel. It is also known to improve turbine performance by providing vanes, referred to as nozzle vanes, in the inlet passage so as to deflect gas flowing through the inlet passage towards the direction of rotation of the turbine wheel. Turbines may be of a fixed or variable geometry type. Variable geometry turbines differ from fixed geometry turbines in that the size of the inlet passage can be varied to optimise gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level which ensures efficient turbine operation by reducing the size of the annular inlet passage.

In a centrifugal compressor the compressed air immediately downstream of the impeller wheel flows into an annular diffuser passage and then out of the diffuser passage into the compressor outlet volute. It is known that uncontrolled flow of compressed air in clearances defined between the tips of the impeller blades and the surrounding walls of the compressor housing can negatively affect compressor stage efficiency. In a conventional compressor, efficient flow of compressed air through the diffuser passage is typically managed by minimising such clearances and smoothly reducing the flow area of the diffuser passage from its entrance proximate the impeller wheel blades to a downstream 'pinch' region. In spite of this work, there is a need to further improve compressor stage efficiency.

SUMMARY

It is an object of the present disclosure to obviate or mitigate one or more of the problems set out above.

A further object of the present disclosure is to provide a compressor exhibiting improved compressor stage efficiency.

According to a first aspect of the present disclosure there is provided a compressor comprising: a housing having an axial intake and an annular outlet volute; an impeller mounted on a shaft for rotation about a shaft axis between the axial intake and the annular outlet volute; the impeller having a plurality of blades, each blade having a front edge which faces the axial intake and a tip; the impeller defining an outer diameter, OD; said annular outlet volute including an annular diffuser passage surrounding the impeller; said annular diffuser passage having a diffuser inlet downstream of said plurality of blades and a diffuser outlet communicating with the annular outlet volute, the tips of the blades sweeping across said diffuser inlet during use; and a wall of the housing which defines the annular diffuser passage and which extends over the front edges of the blades defining an annular recess extending from the diffuser inlet towards the diffuser outlet; the annular recess defining an outer diameter, L; wherein (L/OD) is greater than or equal to about 1.1.

While conventional wisdom in this technical field was that the region of the diffuser passage immediately downstream of its entrance should have a flow area that reduces smoothly or linearly towards its narrowed, 'pinch' region, the devisors of the present disclosure have appreciated for the first time that provision of a recess in the diffuser passage, as set out in the various aspects and embodiments of the present disclosure defined herein, can in fact improve the efficiency of the compressor stage, even though the recess increases the cross-sectional area of the diffuser passage in the vicinity of the recess extending downstream from the diffuser inlet. While not wishing to be bound by any particular theory, it is envisaged that the increased flow area afforded by the recess enables the potentially turbulent compressed gas generated at the tips of the impeller wheel blades to flow more smoothly through the diffuser passage, via a pinch region in the diffuser passage, if present. Since flow is more uniform through the diffuser passage, flow into the outlet volute is also more uniform and so losses in the scroll of the outlet volute are reduced, as illustrated in FIGS. 4 and 5, which are described in more detail below.

The ratio of the outer diameter of the annular recess (L) to the outer diameter of the impeller (OD), i.e. (L/OD), may be greater than or equal to about 1.2 or about 1.3. In one embodiment (L/OD) is in the range about 1.3 to about 1.4, that is, about 1.3≤(L/OD)≤about 1.4.

In an embodiment, a clearance, C, is defined between the wall of the housing which extends over the front edges of the blades and the front edges of the blades, and each blade tip defines an axial length, T. (C/T) may be about 0.05 to about 0.15, or about 0.075 to about 0.125, or about 0.10.

In a further embodiment, the recess defines a depth, D, at its radially inner end, and each blade tip defines an axial length, T. (D/T) may be about 0.05 to about 0.25, or about 0.10 to about 0.20, or about 0.15.

In another embodiment, a clearance, C, is defined between the wall of the housing which extends over the front edges of the blades and the front edges of the blades, and the recess defines a depth, D, at its radially inner end. (D/C) may be about 1.2 to about 1.6, or about 1.3 to about 1.5, or about 1.4.

The recess may extend along any desirable proportion of the annular diffuser passage. That is, the recess may extend along the full length of the annular diffuser passage from the diffuser inlet all of the way to the diffuser outlet, or it may extend over one or more subsections of the full length of the annular diffuser passage. In one embodiment, the recess extends approximately 20 to 80% of the radial distance from the diffuser inlet to the diffuser outlet. Said recess may extend approximately 40 to 60% of the radial distance from the diffuser inlet to the diffuser outlet or it may extend approximately 50% of the radial distance from the diffuser inlet to the diffuser outlet.

The recess may be provided in the housing wall with any desirable depth which may or may not vary along its length from the diffuser inlet to the diffuser outlet. The depth of the recess at its radially inner end, which will be proximate the impeller blade tips, may be approximately 1 to 30% of the axial length 'T' of the tips of the impeller blades, i.e. the length of the tips of the impeller blades measured along a line extending parallel to the longitudinal axis of the shaft on which the impeller is mounted, as depicted for exemplary purposes in FIG. 6. The depth 'D' of the recess at its radially inner end may be approximately 2 to 25% of the axial length 'T' of the blade tips or approximately 7 to 15% of the axial length 'T' of the blade tips. In one embodiment, the depth 'D' of the recess at its radially inner end is around 10% of the axial length 'T of the blade tips.

The depth 'D' of the annular recess, which may or may not be measured axially, may be greater, i.e. larger, at its radially inner end than at its radially outer end. The depth of the annular recess may reduce from a location between the diffuser inlet and diffuser outlet towards the diffuser outlet. The depth of the annular recess may reduce substantially linearly or non-linearly from said location towards the diffuser outlet. Said location may be approximately 20 to 90% of the distance from the radially inner end of the recess to its radially outer end or approximately 30 to 80% of said distance. Moreover, the location may be approximately 40 to 70% of the distance from the radially inner end of the recess to its radially outer end. In one embodiment, said location is around 50 to 60% of said distance.

The depth 'D' of the annular recess may be substantially constant throughout its radial extent or it may vary linearly or non-linearly throughout its radial extent. The depth of the annular recess may be substantially constant throughout approximately 30 to 80% or approximately 40 to 70% of the length of the recess from its radially inner end to its radially outer end. In one embodiment, the depth of the annular recess is substantially constant throughout approximately 50 to 60% of said length.

The inner diameter (IDrecess) of the recess is preferably substantially the same as the outer diameter (OD) of the blades of the impeller. That is, it is preferred that the radially inner end of the recess lies at substantially the same diameter as that of the impeller blade tips, i.e. it is preferred that IDrecess≈OD.

The radially inner end of the recess may be defined as a step in the wall of the housing which defines the annular diffuser passage. The term 'step' should be understood to refer to a relatively sudden change or discontinuity in the profile of the wall defining the annular diffuser passage and which extends over the front edges of the impeller blades. The step preferably includes an edge which extends substantially perpendicular to a tangent to the profile of the wall at the point from which the edge extends.

The recess may define a surface of the wall of the housing, said surface being a smooth generally radially extending surface with no discontinuities.

The recess may define a surface of the wall of the housing, said surface being a generally radially extending surface that includes no edges that, in use, could oppose or reverse fluid flowing from the diffuser inlet to the diffuser outlet, it being appreciated that this necessarily excludes the step or discontinuity that preferably defines the radially inner end of the recess, since the aforementioned surface is defined by the recess and the recess only begins at its radially inner end.

In one embodiment, the compressor has a vaneless annular diffuser passage, that is, it is preferred that there are no vanes provided in the annular diffuser passage.

A second aspect of the present disclosure provides a turbocharger comprising a compressor according to the first aspect of the present disclosure and a turbine wheel rotatably mounted on said shaft.

A third aspect of the present disclosure provides a compressor housing for an impeller defining an outer diameter, OD, the compressor housing comprising: an axial intake and an annular outlet volute; said annular outlet volute including an annular diffuser passage to surround a compressor impeller when mounted within the housing to define a compressor; said annular diffuser passage having a diffuser inlet and a diffuser outlet communicating with the annular outlet volute; wherein an axially outboard side of a wall of the housing which defines the annular diffuser passage defines an annular recess extending from the diffuser inlet towards the diffuser outlet; the annular recess defining an outer diameter, L; wherein (L/OD) is greater than or equal to about 1.1.

Other advantageous and preferred features of the disclosure will be apparent from the following description.

BRIEF DESCRIPTION OF THE FIGURES

Specific embodiments of the present invention will now be described, by way of example only, with reference to the accompanying drawings, in which.

DETAILED DESCRIPTION OF EMBODIMENTS OF THE DISCLOSURE

Figure 1:
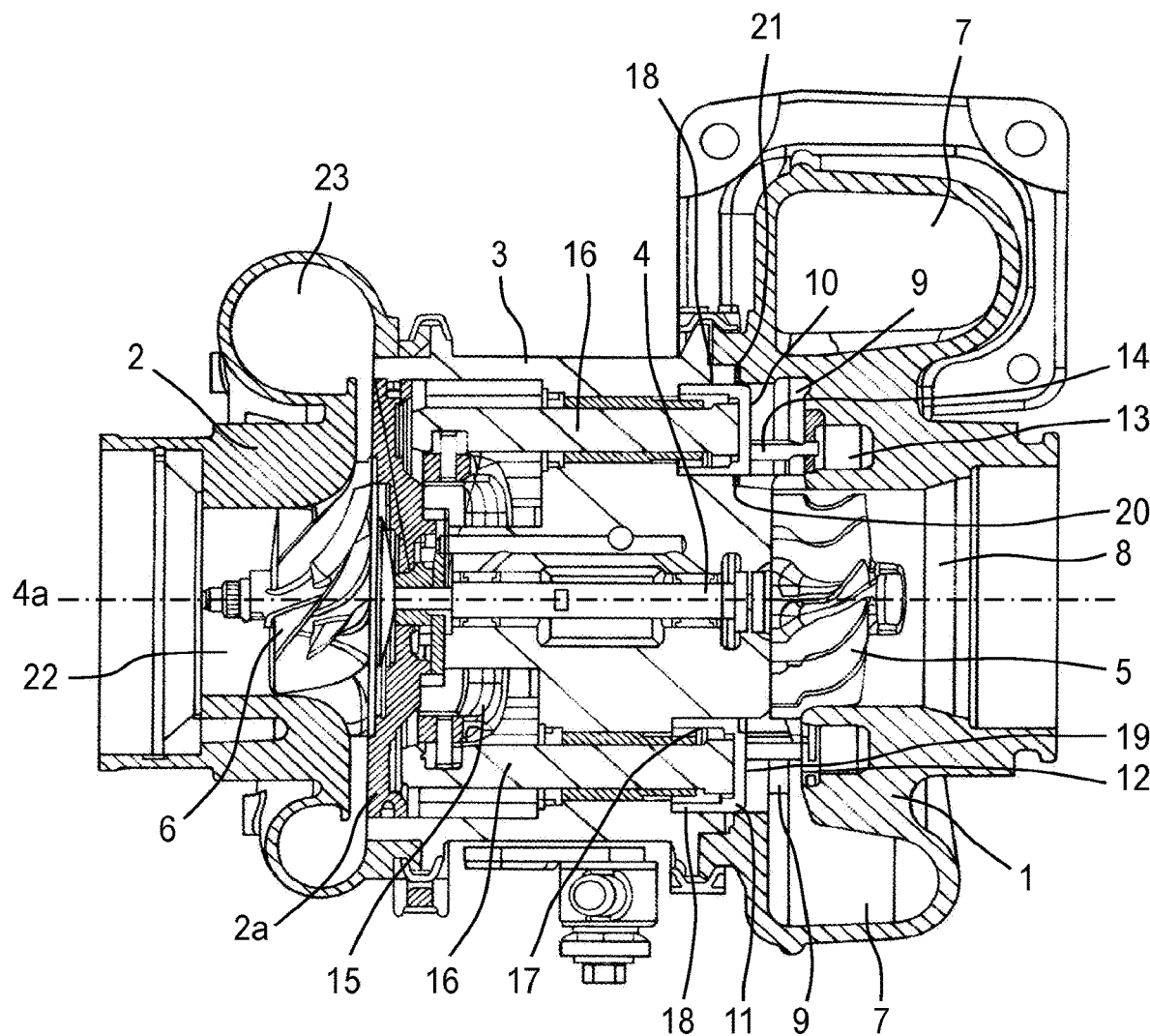
FIG. 1 is an axial cross-section through a known variable geometry turbocharger.

Referring to FIG. 1, this illustrates a known variable geometry turbocharger comprising a housing comprised of a variable geometry turbine housing 1 and a compressor housing 2 (sometimes referred to as a compressor 'shroud') interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis 4a on bearing assemblies located in the bearing housing 3. In between the compressor housing 2 and the bearing housing 3 is a diffuser plate 2a which is recessed to accommodate an inboard portion of the compressor wheel 6, i.e. a portion nearest to the bearing housing 3, to increase the efficiency of the compressor stage.

The turbine housing 1 defines an inlet volute 7 to which gas from an internal combustion engine (not shown) is delivered. The exhaust gas flows from the inlet volute 7 to an axial outlet passage 8 via an annular inlet passage 9 and the turbine wheel 5. The inlet passage 9 is defined on one side by a face 10 of a radial wall of a movable annular wall member 11, commonly referred to as a "nozzle ring", and on the opposite side by an annular shroud 12 which forms the wall of the inlet passage 9 facing the nozzle ring 11. The shroud 12 covers the opening of an annular recess 13 in the turbine housing 1.

The nozzle ring 11 supports an array of circumferentially and equally spaced inlet vanes 14 each of which extends across the inlet passage 9. The vanes 14 are orientated to deflect gas flowing through the inlet passage 9 towards the direction of rotation of the turbine wheel 5. When the nozzle ring 11 is proximate to the annular shroud 12, the vanes 14 project through suitably configured slots in the shroud 12, into the recess 13.

The position of the nozzle ring 11 is controlled by an actuator assembly of the type disclosed in U.S. Pat. No. 5,868,552. An actuator (not shown) is operable to adjust the position of the nozzle ring 11 via an actuator output shaft (not shown), which is linked to a yoke 15. The yoke 15 in turn engages axially extending actuating rods 16 that support the nozzle ring 11. Accordingly, by appropriate control of the actuator (which may for instance be pneumatic or electric), the axial position of the rods 16 and thus of the nozzle ring 11 can be controlled. The speed of the turbine wheel 5 is dependent upon the velocity of the gas passing through the annular inlet passage 9. For a fixed rate of mass of gas flowing into the inlet passage 9, the gas velocity is a function of the width of the inlet passage 9, the width being adjustable by controlling the axial position of the nozzle ring 11. FIG. 1 shows the annular inlet passage 9 fully open. The inlet passage 9 may be closed to a minimum by moving the face 10 of the nozzle ring 11 towards the shroud 12.

The nozzle ring 11 has axially extending radially inner and outer annular flanges 17 and 18 that extend into an annular cavity 19 provided in the turbine housing 1. Inner and outer sealing rings 20 and 21 are provided to seal the nozzle ring 11 with respect to inner and outer annular surfaces of the annular cavity 19 respectively, whilst allowing the nozzle ring 11 to slide within the annular cavity 19. The inner sealing ring 20 is supported within an annular groove formed in the radially inner annular surface of the cavity 19 and bears against the inner annular flange 17 of the nozzle ring 11. The outer sealing ring 20 is supported within an annular groove formed in the radially outer annular surface of the cavity 19 and bears against the outer annular flange 18 of the nozzle ring 11.

Gas flowing from the inlet volute 7 to the outlet passage 8 passes over the turbine wheel 5 and as a result torque is applied to the shaft 4 to drive the compressor wheel 6. Rotation of the compressor wheel 6 within the compressor housing 2 pressurizes ambient air present in an air inlet 22 and delivers the pressurized air to an air outlet volute 23 from which it is fed to an internal combustion engine (not shown).

Figure 2:
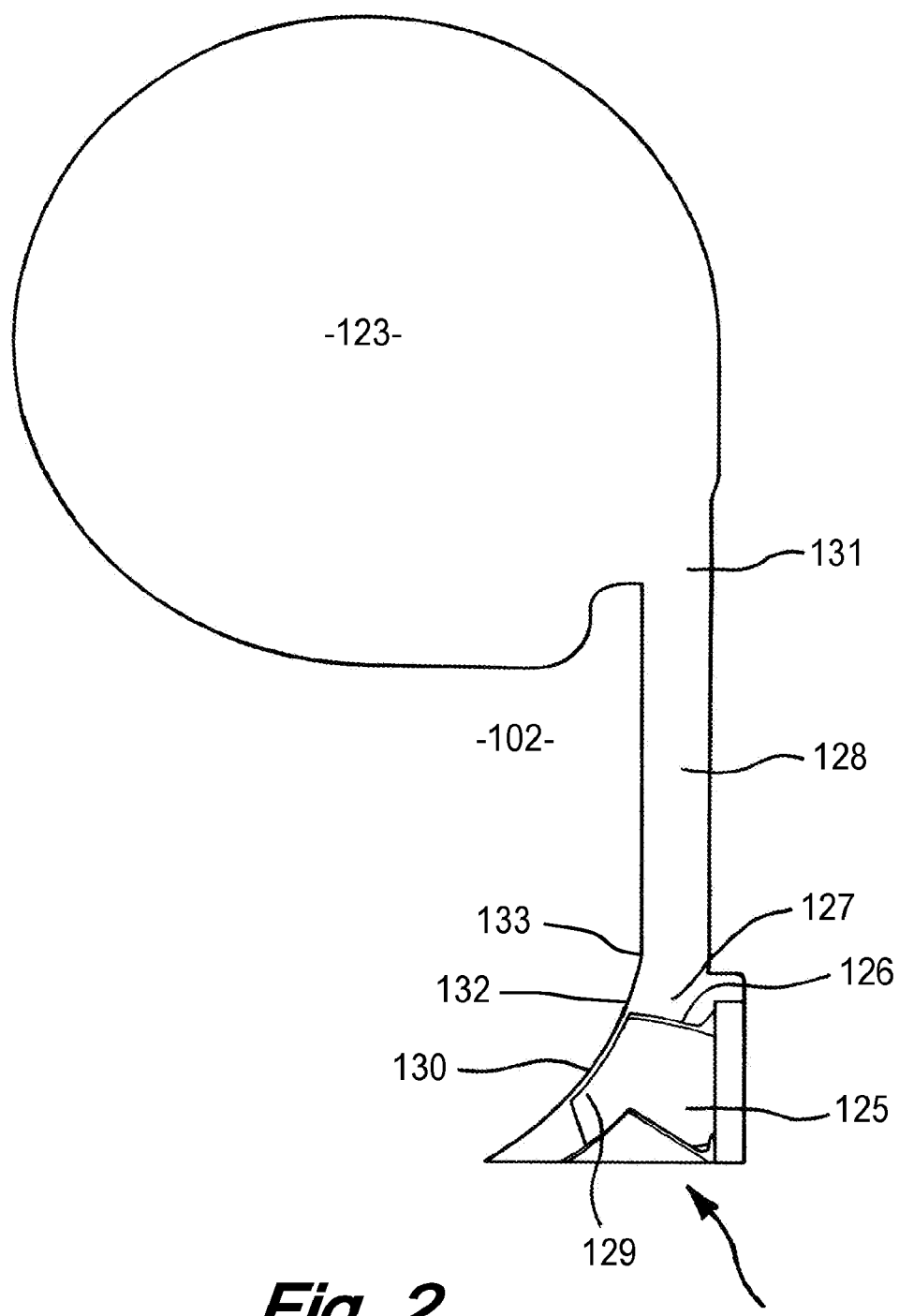
FIG. 2 is a cross-sectional schematic drawing of the compressor stage of a turbocharger of the kind shown in FIG. 1.
Figure 3:
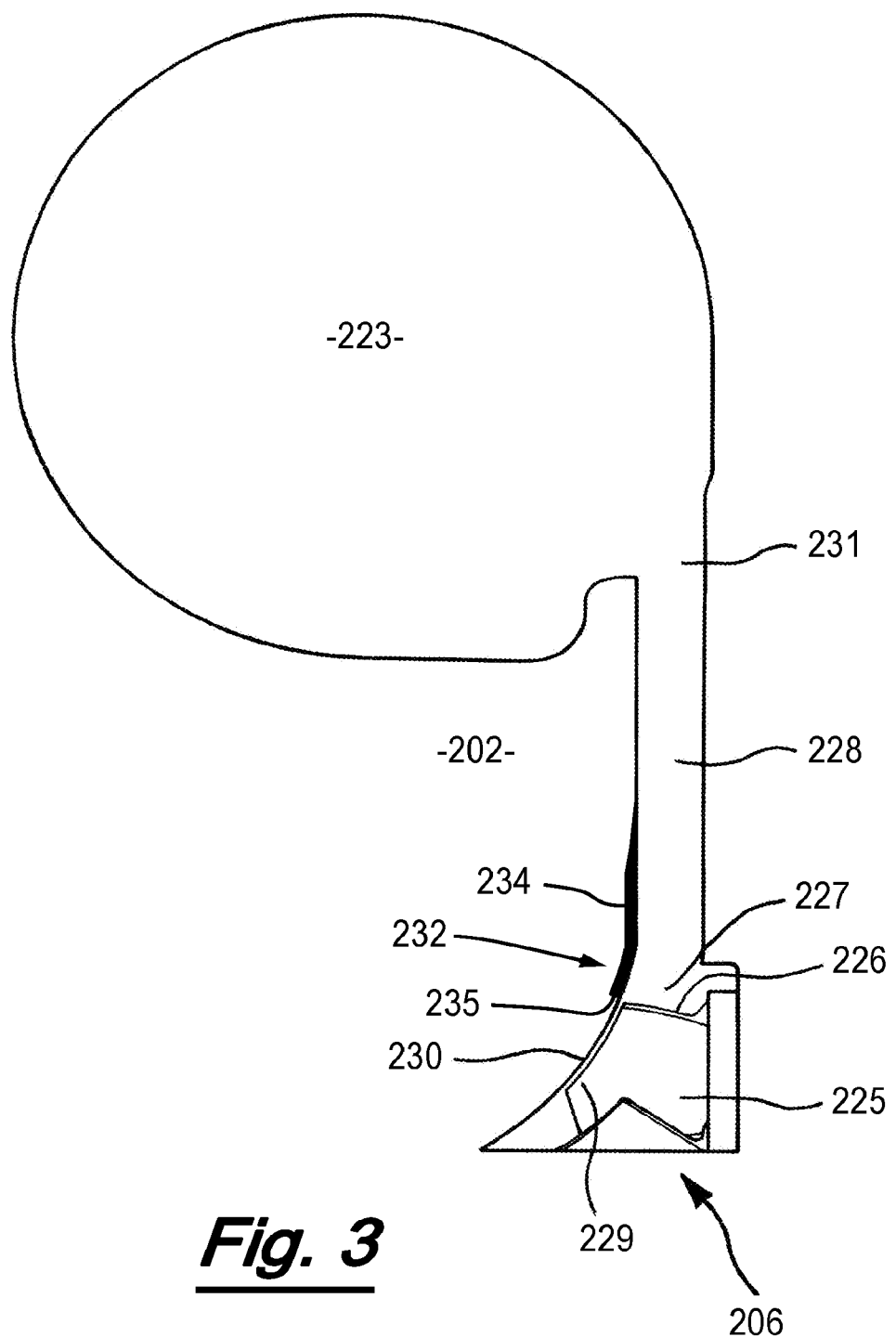
FIG. 3 is a cross-sectional schematic drawing of the compressor stage of a turbocharger of the kind shown in FIG. 1, in which the compressor is in accordance with a first embodiment of the first aspect of the present disclosure.
Figure 4:
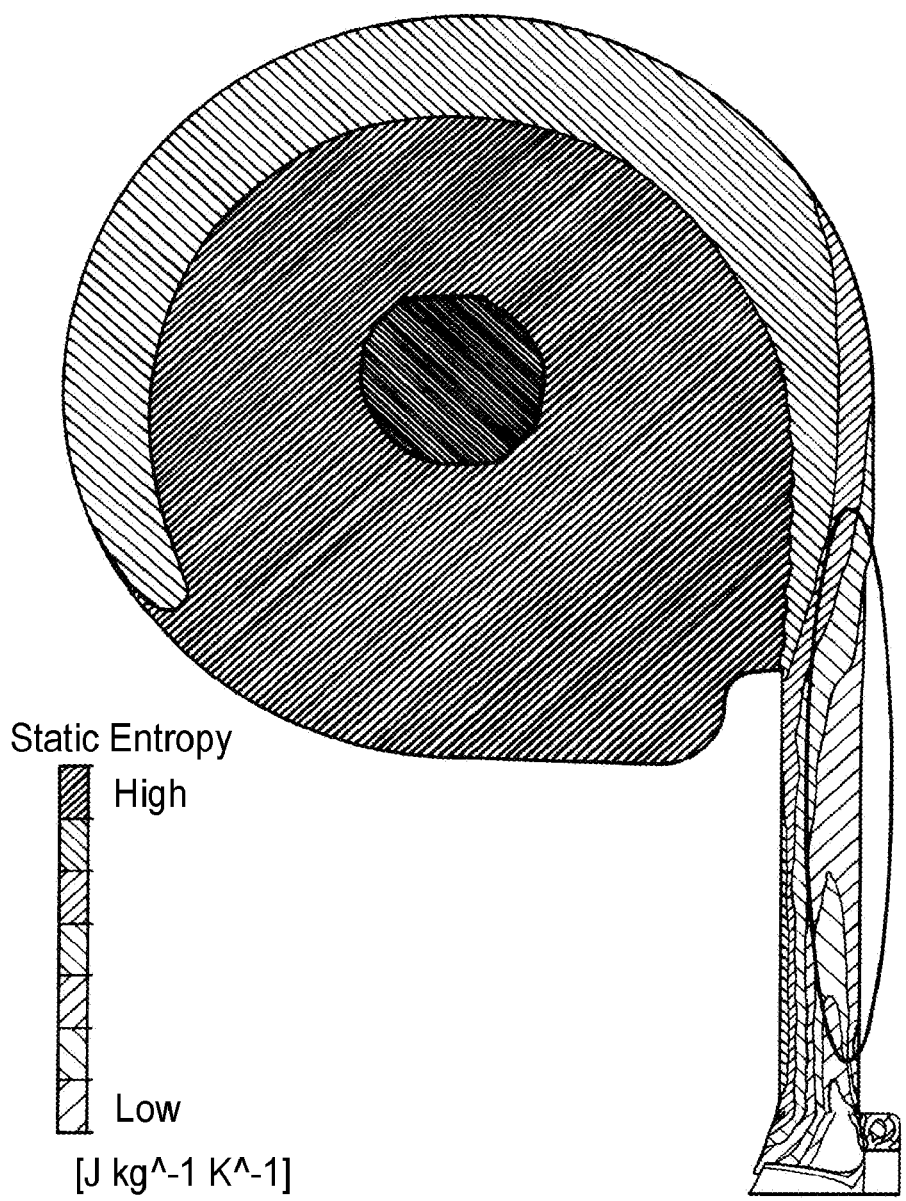
FIG. 4 is a cross-sectional image of the known compressor stage shown in FIG. 2 overlaid with a colour-coded map illustrating losses in the annular diffuser passage and annular outlet volute of the compressor.
Figure 5:
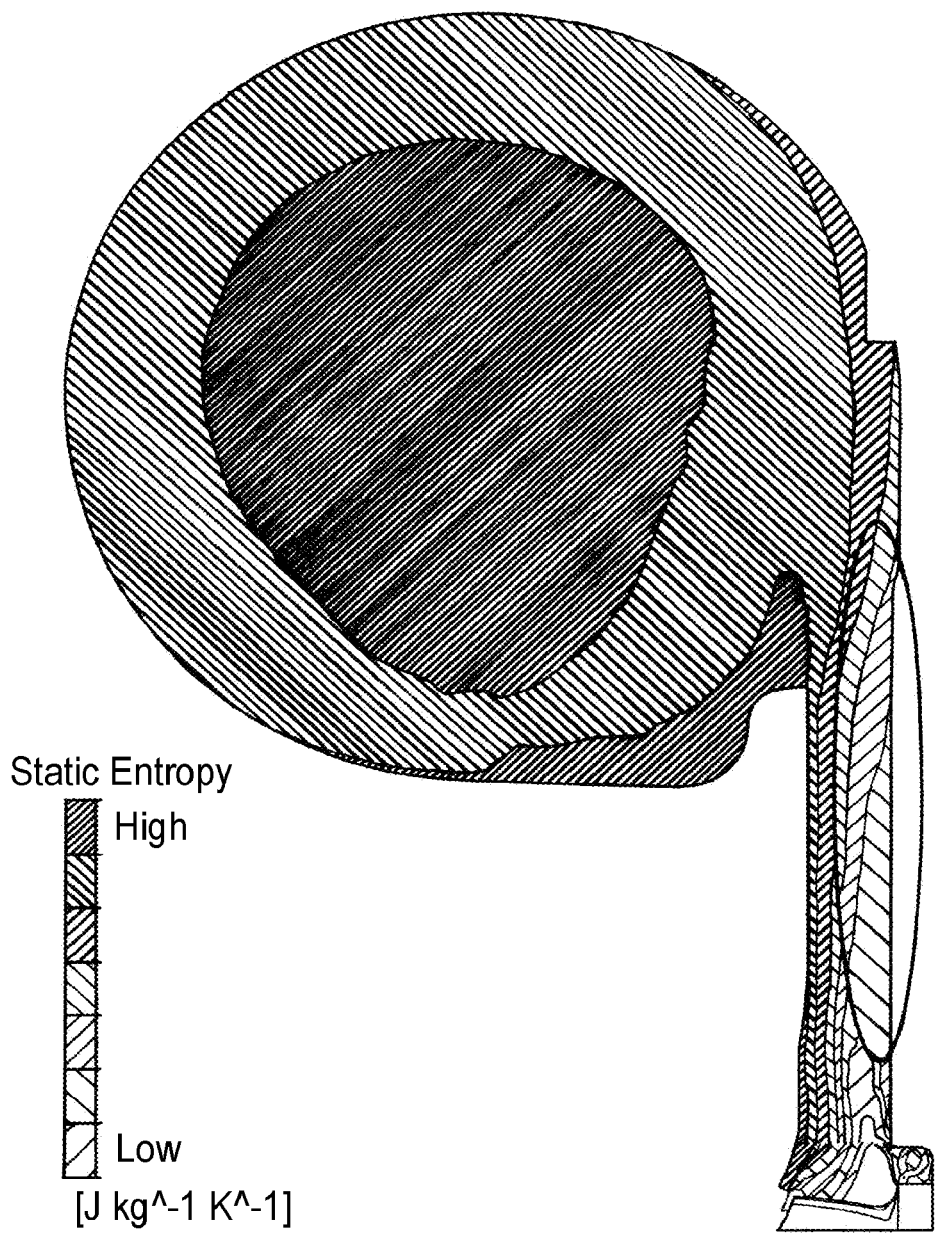
FIG. 5 is a cross-sectional image of the compressor stage of the present disclosure shown in FIG. 3 overlaid with a colour-coded map illustrating losses in the annular diffuser passage and annular outlet volute of the compressor.

FIGS. 2 and 4 illustrate an upper section of a known compressor of the kind used in a turbocharger of the type described above in relation to FIG. 1. FIGS. 3 and 5 are analogous to FIGS. 2 and 4 respectively but illustrate an upper section of a compressor 224 in accordance with a first embodiment of the present disclosure. FIGS. 2 and 4 are therefore included for comparison to FIGS. 3 and 5 to highlight features of the present disclosure.

With regard to FIG. 2, features common to FIG. 1 will take the same reference numbers but increased by 100. Referring to FIG. 2, a compressor impeller wheel 106 has a plurality of blades 125, each having a front radial edge (not shown), which in use rotates within an air inlet (not shown) of a compressor housing 102, a tip 126 which sweeps across an annular inlet 127 of an annular diffuser passage 128 of the compressor housing 102, and a curved edge 129 defined between the front radial edge and the tip 126 which sweeps across a surface 130 of the compressor housing 102 defined between the air inlet and the diffuser passage 128. The diffuser passage 128 further defines an annular outlet 131 through which compressed air passes into an air outlet volute 123.

As can be seen in FIG. 2, an axially outboard section 132 of a wall of the compressor housing 102 immediately downstream of the tips 126 of the blades 125 has a smooth, regularly curved profile extending towards a relatively narrow 'pinch' region 133 of the diffuser passage 128 downstream of the inlet 127 to the diffuser passage 128. Downstream of the pinch region 133 the diffuser passage 128 is defined by smooth, continuous radially extending walls of constant spacing such that the diffuser passage has a constant axial width throughout its length as it extends radially outwards to the air outlet volute 123.

In FIG. 3, features common to FIG. 2 will take the same reference numbers but increased by 100. FIG. 3 shows a compressor impeller wheel 206 with blades 225 of the same basic structure to those shown in FIG. 2. That is, each blade 225 has a front radial edge (not shown), a tip 226 which sweeps across an annular inlet 227 of an annular diffuser passage 228, and a curved edge 229 defined between the front radial edge and the tip 226 which sweeps across a surface 230 of a compressor housing 202 between an air inlet (not shown) and the diffuser passage 228. The diffuser passage 228 further defines an annular outlet 231 through which compressed air passes into an air outlet volute 223.

A radially outboard section 232 of a wall of the compressor housing 202 immediately downstream of the tips 226 of the blades 225 defines an annular recess 234 (coloured black for clarity) extending from the inlet 227 towards the diffuser outlet 231. The recess 234 is partly defined by section 232 of the wall defining a step 235 which extends outboard (i.e. away from the bearing housing (not shown)) in a direction that is transverse to the turbocharger axis (not shown). This relatively sudden change in profile of that section 232 of the wall of the compressor housing 202 can be contrasted with the smooth, regularly curved profile of the corresponding section 132 of the wall of the compressor housing 102 shown in FIG. 2.

The annular recess 234 extends from the inlet 227 into the diffuser passage 228 with a substantially constant depth over approximately 60% of its length from its upstream end adjacent the inlet 227. From that point onwards, the depth of the recess 234 uniformly reduces to zero at a point approximately half way along the diffuser passage 228, i.e. at a diameter half way between the diameters of the inlet 227 and outlet 231 of the diffuser passage 228. This is, of course, just one embodiment. In other applications, the recess may vary in depth throughout its length or may include one or more sections of varying depth. Moreover, any changes in depth may be defined by smooth profiling of the section 232 of the wall of the compressor housing 202 or by sharper 'step-like' features. Moreover, the recess 234 may extend to any desirable diameter, i.e. along any desirable radial length of the diffuser passage 228, from the inlet 227. Furthermore, it may be desirable to include a further recess in an inboard side wall of the compressor housing which defines the diffuser passage 228.

Computational fluid dynamics (CFD) simulations were carried out with ANSYS™ CFX software using SST turbulence modelling to determine the efficiency with which the flow of compressed air from the compressor 106, 206 is managed by the diffuser passage 128, 228 before passing into the air outlet volute 123, 223 in the prior art system depicted in FIG. 2 and the new system depicted in FIG. 3. Results from these calculations are shown in FIGS. 4 and 5. Reference numbers used in FIGS. 2 and 3 have been omitted from FIGS. 4 and 5 for the sake of clarity. As shown in the key in FIGS. 4 and 5, areas of higher predicted static entropy (in Jkg-1K-1) are more darkly coloured, while those of lower static entropy are more lightly coloured. Higher static entropy at any particular point indicates higher losses in efficiency at that point, while lower static entropy indicates lower losses.

It is evident from FIGS. 4 and 5 that efficiency losses in the diffuser passage 228 of the compressor 206 according to the present disclosure are lower than losses in the diffuser passage 128 of the prior art compressor 106. Without wishing to be bound by any particular theory, it is suggested that this is due to the annular recess 234 creating a localised 'pinch' on the low momentum flow of compressed air generated in the clearance between the impeller blades and the adjacent wall of the housing. This 'pinch' accelerates the tip clearance flow, reducing mixing loses and allowing the potentially turbulent compressed air leaving the blade tips 226 to adopt a more stable, uniform flow pattern along the recessed diffuser passage 228 in the compressor 206 according to the present disclosure than the compressed air flowing through the diffuser passage 128 in the conventional compressor 106. As a result of this more uniform flow, lower losses in efficiency are observed in the scroll section of the air outlet volute 223 of the compressor 206 according to the present disclosure as compared to the air outlet volute 123 of the known compressor 106.

Figure 6:
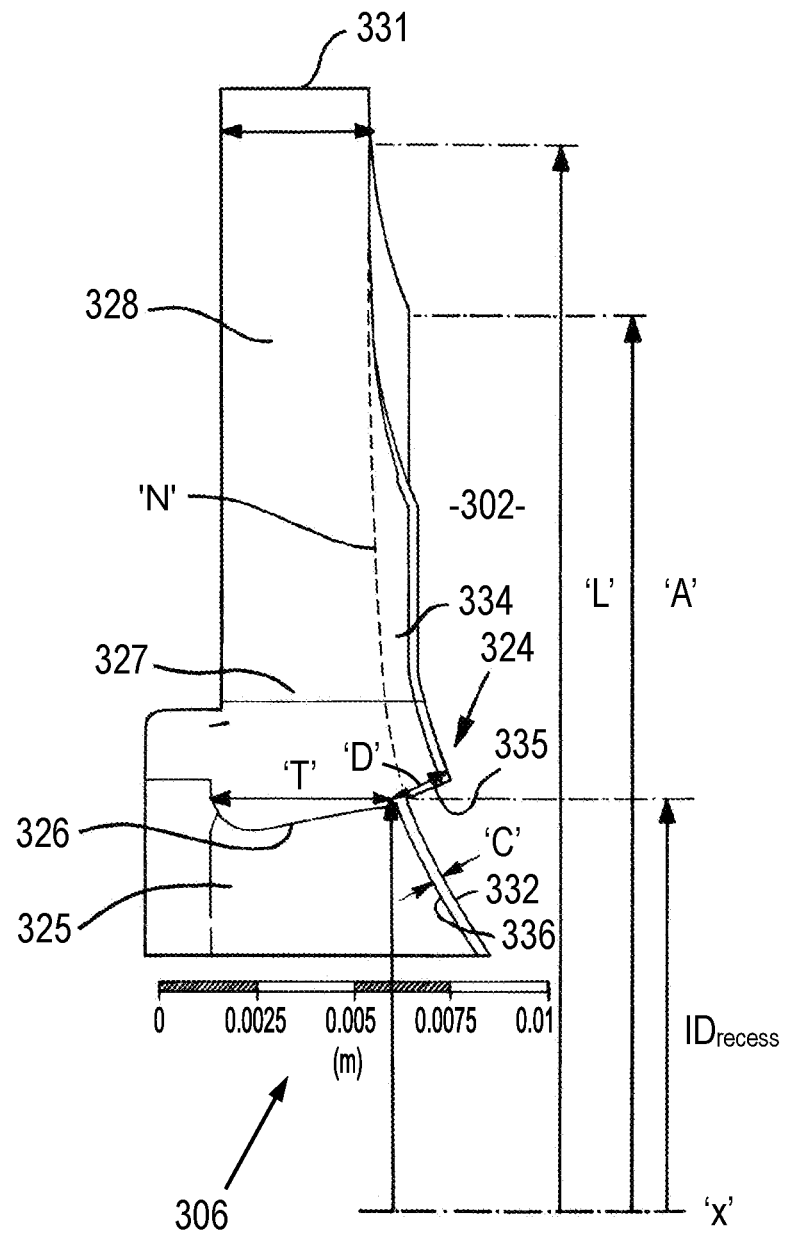
FIG. 6 is a cross-sectional schematic drawing of a compressor stage of a turbocharger of the kind shown in FIG. 1, in which the compressor is in accordance with a second embodiment of the first aspect of the present disclosure with various dimensions labelled thereon to aid an understanding of the present disclosure.

FIG. 6 shows a second embodiment of a compressor according to the disclosure in which various dimensions used to define features of the present disclosure have been labelled. Features on FIG. 6 common to FIG. 3 will take the same reference numbers but increased by 100.

The compressor 306 includes a plurality of blades 325 having tips 326 of axial length 'T' and where a clearance 'C' is defined between the front or leading edges 336 of the blades 325 and an adjacent section 332 of a wall of the compressor housing 302. As described above with reference to FIG. 3, in the present embodiment shown in FIG. 6 an axially outboard section 332 of a wall of a compressor housing 302 immediately downstream of the tips 326 of the blades 325 defines an annular recess 334 extending from a diffuser inlet 327 towards a diffuser outlet 331. For comparison, a dotted line 'N' illustrates the profile of a conventional, prior art, diffuser passage.

The radially inner end of recess 324 is defined by the section 332 of the wall defining a step 335 which extends outboard (i.e. away from the bearing housing (not shown)) in a direction that is transverse to the turbocharger axis 'x'. This relatively sudden change in profile of that section 332 of the wall of the compressor housing 302 can be contrasted with the smooth, regularly curved profile of the corresponding section 132 of the wall of the compressor housing 102 shown in FIG. 2 and the dotted line 'N'. The depth 'D' of the recess is used herein to refer to the extent to which the recess extends into the wall of the compressor housing 302 that defines the annular diffuser passage 328 and is measured at any particular diameter along the diffuser passage 328 along an axis that extends orthogonal to a tangent drawn at that diameter to the conventional profile of the diffuser passage 'N'. Accordingly, 'D' at the radially inner end of the recess 334, i.e. at the step 335, is defined along an axis that extends transverse to the radial axis of the compressor 306 but that is not orthogonal to the radial axis such that the axis along which 'D' is measured is not parallel to the turbocharger axis 'x'. In the embodiment shown in FIG. 6, as the diameter at which 'D' is measured increases, the axis along which 'D' is measured becomes increasingly close to parallel to the turbocharger axis 'x' until the point at which the dotted line, 'N', extends radially.

While the invention has been illustrated and described in detail in the drawings and foregoing description, the same is to be considered as illustrative and not restrictive in character, it being understood that only the certain embodiments have been shown and described and that all changes and modifications that come within the scope of the inventions as defined in the claims are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. For the avoidance of doubt, optional and/or preferred features as set out herein may be used either individually or in combination with each other where appropriate and particularly in the combinations as set out in the accompanying claims. The optional and/or preferred features for each aspect of the invention set out herein are also applicable to any other aspects of the invention, where appropriate.

The invention claimed is:

1. A compressor comprising:
   a housing having an axial intake and an annular outlet volute;
   an impeller mounted on a shaft for rotation about a shaft axis between the axial intake and the annular outlet volute;
   the impeller having a plurality of blades, each blade having a front edge which faces the axial intake and a tip;
   the impeller defining an outer diameter, OD;
   said annular outlet volute including an annular diffuser passage surrounding the impeller;
   said annular diffuser passage having a diffuser inlet downstream of said plurality of blades and a diffuser outlet, said diffuser outlet communicating with the annular outlet volute, the tips of the blades sweeping across said diffuser inlet during use; and
   a wall of the housing which defines the annular diffuser passage and which extends over the front edges of the blades defining an annular recess extending from the diffuser inlet towards the diffuser outlet;
   the annular recess defining an outer diameter, L;
   wherein (L/OD) is greater than or equal to 1.1;
   the recess defines a depth, D, at a radially innermost end of the recess and each blade tip defines an axial length, T;
   wherein (D/T) is 0.05 to 0.25.

2. A compressor according to claim 1, wherein (L/OD) is greater than or equal to 1.2.

3. A compressor according to claim 1, wherein (L/OD) is in the range of 1.3 to 1.4.

4. A compressor according to claim 1, wherein a clearance, C, is defined between the wall of the housing which extends over the front edges of the blades and the front edges of the blades, and wherein (C/T) is 0.05 to 0.15.

5. A compressor according to claim 1, wherein a clearance, C, is defined between the wall of the housing which extends over the front edges of the blades and the front edges of the blades, and wherein (D/C) is 1.2 to 1.6.

6. A compressor according to claim 5, wherein (D/C) is 1.4.

7. A compressor according to claim 1, wherein D is 7 to 15% of the axial length of said blade tips.

8. A compressor according to claim 1, wherein D is 10% of the axial length of said blade tips.

9. A compressor according to claim 1, wherein the depth, D, is greater at the radially innermost end of the recess than at a radially outer end of the recess.

10. A compressor according to claim 1, wherein the depth, D, reduces from a location between the diffuser inlet and the diffuser outlet towards the diffuser outlet.

11. A compressor according to claim 10, wherein the depth, D, of the annular recess reduces linearly from said location towards the diffuser outlet.

12. A compressor according to claim 10, wherein said location is 30 to 80% of a distance from the radially innermost end of the recess to a radially outer end of the recess.

13. A compressor according to claim 10, wherein said location is 40 to 70% of a distance from the radially innermost end of the recess to a radially outer end of the recess.

14. A compressor according to claim 1, wherein the depth, D, is constant throughout 30 to 80% of a length of the recess from the radially innermost end of the recess to a radially outer end of the recess.

15. A compressor according to claim 1, wherein the depth, D, is constant throughout 40 to 70% of a length of the recess from the radially innermost end of the recess to a radially outer end of the recess.

16. A compressor according to claim 1, wherein an inner diameter of the recess, IDrecess, is the same as the outer diameter, OD, of the impeller.

17. A compressor according to claim 1, wherein the radially innermost end of the recess is defined as a step in the wall of the housing which defines the annular diffuser passage.

18. A compressor according to claim 1, wherein the recess defines a surface of said wall of the housing, said surface being a smooth generally radially extending surface with no discontinuities.

19. A compressor according to claim 1, wherein the recess defines a surface of said wall of the housing, said surface being a generally radially extending surface that includes no edges that, in use, could oppose or reverse fluid flowing from the diffuser inlet to the diffuser outlet.

20. A compressor according to claim 1, wherein no vanes are provided in the annular diffuser passage.

21. A turbocharger comprising:
    a compressor according to claim 1; and
    a turbine wheel rotatably mounted on said shaft.

22. A compressor housing for an impeller defining an outer diameter, OD, the compressor housing comprising:
    an axial intake and an annular outlet volute;
    said annular outlet volute including an annular diffuser passage to surround a compressor impeller when mounted within the housing to define a compressor;
    said annular diffuser passage having a diffuser inlet and a diffuser outlet, said diffuser outlet communicating with the annular outlet volute;
    wherein an axially outboard side of a wall of the housing which defines the annular diffuser passage defines an annular recess extending from the diffuser inlet towards the diffuser outlet;
    the annular recess defining an outer diameter, L;
    wherein (L/OD) is greater than or equal to 1.1;
    the recess defines a depth, D, at a radially innermost end of the recess and each blade tip defines an axial length, T;
    wherein (D/T) is 0.05 to 0.25.

* * * * *